United States Patent
Boose et al.

(10) Patent No.: US 7,439,987 B2
(45) Date of Patent: Oct. 21, 2008

(54) VECTOR GRAPHIC NORMALIZER

(75) Inventors: Molly L Boose, Bellevue, WA (US);
Lawrence S Baum, Bellevue, WA (US);
Carey S Chaplin, Seattle, WA (US);
Sonia E Smith, New Castle, WA (US);
Ronald C Provine, Seattle, WA (US)

(73) Assignee: The Boeing Company, Chicago, IL (US)

(*) Notice: Subject to any disclaimer, the term of this patent is extended or adjusted under 35 U.S.C. 154(b) by 247 days.

(21) Appl. No.: 10/396,997

(22) Filed: Mar. 25, 2003

(65) Prior Publication Data

US 2003/0197714 A1 Oct. 23, 2003

Related U.S. Application Data (60) Provisional application No. 60/373,150, filed on Apr. 17, 2002.

(51) Int. Cl.
*G09G 5/00* (2006.01)
*G06T 11/20* (2006.01)
*G06T 1/00* (2006.01)

(52) U.S. Cl. .................. 345/619; 345/441; 345/522

(58) Field of Classification Search ............. 345/501, 345/522, 420, 606, 619, 581, 418, 555, 441, 345/423, 421; 382/242, 243, 232, 305
See application file for complete search history.

(56) References Cited

U.S. PATENT DOCUMENTS

| | | | | | |
|---|---|---|---|---|---|
| 5,684,941 | A * | 11/1997 | Dye | ................ | 345/441 |
| 5,822,503 | A * | 10/1998 | Gass et al. | ................ | 358/1.9 |
| 5,977,987 | A * | 11/1999 | Duluk, Jr. | ................ | 345/441 |
| 6,330,523 | B1 * | 12/2001 | Kacyra et al. | ................ | 702/159 |
| 6,552,732 | B1 * | 4/2003 | Davis et al. | ................ | 345/619 |
| 6,573,903 | B2 * | 6/2003 | Gantt | ................ | 345/619 |
| 2001/0042078 | A1 * | 11/2001 | Anwar | ................ | 707/500 |
| 2003/0098862 | A1 * | 5/2003 | Hunt et al. | ................ | 345/418 |

OTHER PUBLICATIONS

"GREC 2003", Fifth IAPR International Workshop on Graphics Recognition, Computer Vision Center, Barcelona, Catalonia, Spain, Jul. 30-31, 2003.
Chhabra, Atul K., "Graphics Recognition, Recent Advances", Lecture Notes in Computer Science 1941; Third International Workshop, GREC '99 Jaipur, India, Sep. 1999, selected papers.
Kasturi et al., Rangachar, "Graphics Recognition, Methods and Applications", Lecture Notes in Computer Science 1072; First International Workshop University Park, PA, USA, Aug. 1995, selected pages.

\* cited by examiner

*Primary Examiner*—Kee M. Tung
*Assistant Examiner*—Joni Hsu
(74) *Attorney, Agent, or Firm*—Harness, Dickey & Pierce, P.L.C.

(57) ABSTRACT

A computer algorithm that is able to convert a parent CGM file, which may include a plurality of disparate methods of defining objects or high-level primitives, with low-level primitives to produce a child or normalized CGM file that includes a normalized or standard way of defining these same objects. The computer algorithm iterates over the information stored in the parent CGM file to find associations in stored vectors to determine whether disparate elements, such as segments or arcs, are used to define more complex objects. It then normalizes the data into the more complex objects to produce a normalized CGM file. Therefore, the child CGM file includes standardized high-level primitives and less overall data complexity.

29 Claims, 4 Drawing Sheets

VECTOR GRAPHIC NORMALIZER

CROSS-REFERENCE TO RELATED APPLICATIONS

This application claims the benefit of U.S. Provisional Application No. 60/373,150, filed on Apr. 17, 2002. The disclosure of the above application is incorporated herein by reference.

FIELD OF THE INVENTION

The present invention relates to computer graphic metafiles and more particularly to a computer program to normalize a plurality of disparate computer graphic metafile files.

BACKGROUND OF THE INVENTION

It is generally known in the art to provide a computer readable format file that includes definitions of geometries. For example, a file format may include computer graphic metafile (CGM). This CGM file includes graphic information that the computer processes to create an output, on either a computer display or other output device, of a graphical picture. The CGM file can be created by any number of generally known graphics programs. Furthermore, a CGM file can be interpreted by numerous known computer programs running on generally known personal or workstation computers using microprocessors, for example a microprocessor such as the Pentium III® microprocessor having an internal clock speed of about 500 MHz.

Figure 1:
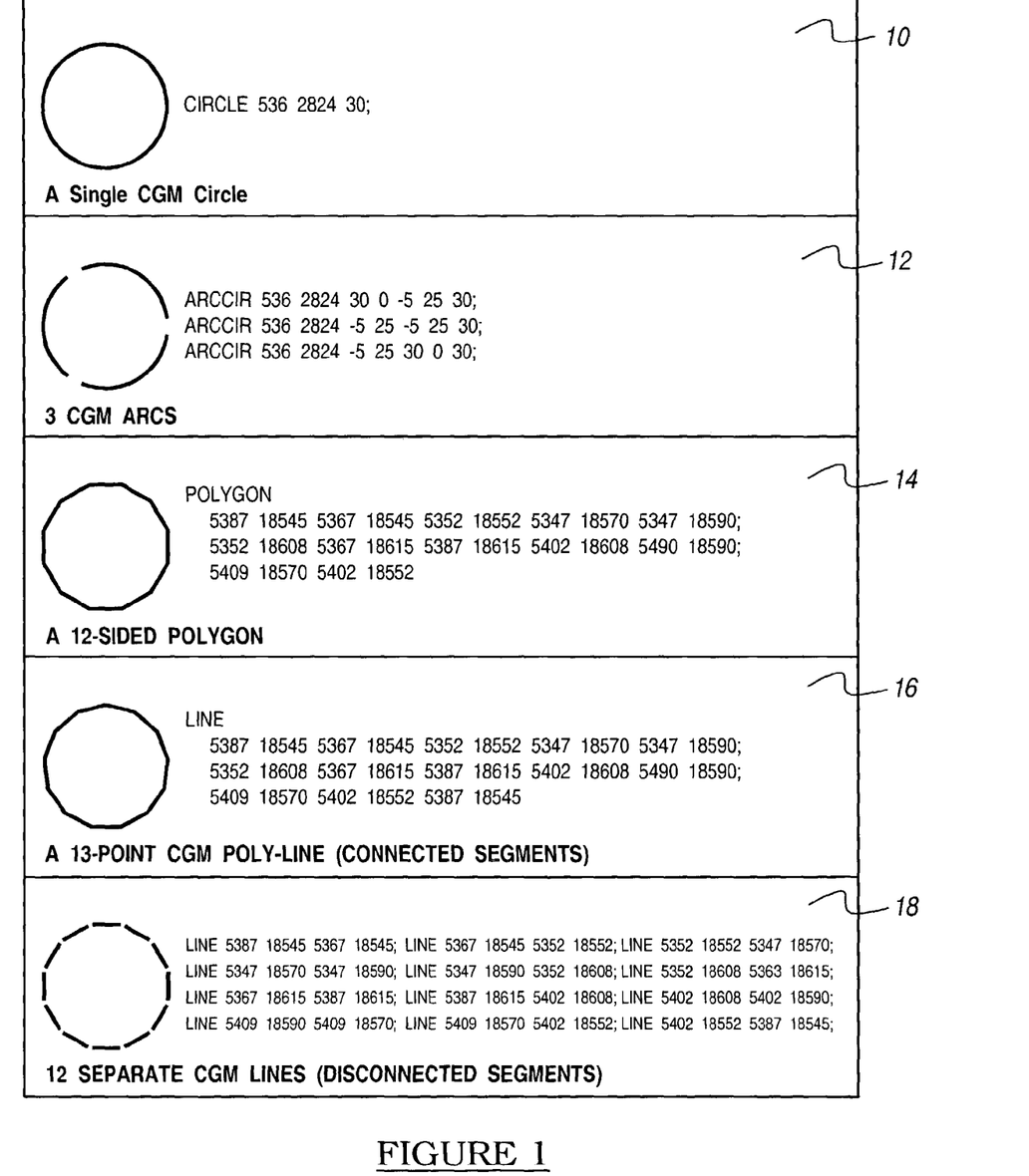
FIG. 1 is a diagrammatic representation of various representations of graphics in generally known computer graphics metafile (CGM)

The CGM file includes logical information that can be used by the computer to produce a graphical output. In particular, the CGM file includes instructions to produce vectors that are displayed on a computer output device. These vectors can be used to define any number of geometries, such as circles, polygons, solid lines, or dashed lines. With reference to FIG. 1, a circle can be displayed on a computer display or output while being defined by the CGM file in several different ways. For example, a first circle 10 may be defined as a circle having a discrete center point and radius that the program, processing a CGM file, draws on the computer display. Alternatively, a second circle 12 may be defined by any number of arcs, such as three arcs, which are closely spaced or interconnected when drawn on the computer display. The second circle 12 is defined by separate and distinct arcs in the CGM file. Alternatively, a third circle 14 output may actually be defined by a polygon in the CGM file. A fourth circle 16 may include a plurality of connected lines segments that appear as a circle on the computer output. A fifth circle 18 in the CGM file may include a plurality of line segments that are disconnected but that appear as a circle on the computer display. A CGM file may define a circle in these or any number of means. Regardless of the means by which the CGM file has stored the circle, the user sees the output as a circle.

The different ways of storing the circle create vastly different amounts of information in the CGM file. In particular, simply defining what appears to be a circle as a circle in the CGM file produces much less data than defining the circle as a plurality of disconnected line segments.

Any number of computer programs produce CGM files, which define graphical outputs viewable by a user. Each of these different computer programs produces CGM files, which may define different segments or objects using vastly different techniques. One consequence of this is that computer programs that define single objects as multiple interconnecting segments produce large and inefficient CGM files that require more time to process and display on a computer. Furthermore, a user in the next step who needs to access and use the information stored in the CGM file needs to be able to interpret the plurality of CGM object representations to understand that a particular object is there. That is, rather than simply interpreting a file that defines an actual circle, the program will also need to recognize that a circle can be defined by a plurality of arcs or lines, and furthermore that those arcs or lines may be connected or disjoint depending upon the program that produced the CGM file.

These complexities and inefficiencies in the CGM files can be produced by any plurality of means. In particular, many computer aided design (CAD) programs include their own proprietary graphics representation techniques. These CAD programs provide only rudimentary or inefficient CGM file exporting capabilities. Therefore, the CGM files exported include inefficiencies produced by the CAD programs when they convert their proprietary format into the CGM file format. In addition, authors themselves may use cut and paste techniques that produce overlapping and duplicate objects in the CGM file. All of these inaccuracies, duplications, and inefficiencies are not easily detected by the user. As discussed above, a circle will always appear as a circle when the computer displays the CGM file, although the CGM file may define the circle in any number of ways.

It would therefore be desirable to be able to produce CGM files that are substantially coherent in defining particular objects. It is also desired to produce these coherent CGM files without requiring the standardization of the programs that produce the initial CGM files. Therefore, it is desired to have a program that can interpret the objects and segments in a first or parent CGM file and produce a second or child CGM file that is both simpler and smaller in size than the parent CGM file. Such a child CGM file would also standardize how an object is defined eliminating the problem of multiple representations for the same object.

SUMMARY OF THE INVENTION

The above features and other advantages are provided by a normalizer computer program in accordance with a preferred embodiment of the present invention. The normalizer is able to take the parent CGM files, which may include a plurality of disparate methods of defining objects, and produce a child or "normalized" CGM file, which includes a normalized or standard way of defining these same objects. The normalizer can interpret the information stored in the parent CGM file, generally referred to as low-level or first level primitives, to find the connection in the data points to determine whether disparate elements, such as lines or arcs, are used to define known objects. It then normalizes the data into the known and standardized objects to produce a normalized CGM file. Therefore, the child CGM file includes standardized high-level primitives and less overall data complexity resulting in a smaller more efficient CGM file.

A preferred embodiment of the present invention provides a computer system to normalize computer graphic files. The system includes a parent computer graphics file including low-level primitives. A first memory system stores the parent computer graphic file. A normalizer computer program forms high-level primitives from the low-level primitives contained in the parent computer graphic file. A microprocessor processes the parent computer graphics file with the normalizer program to form the high-level primitives. A second memory system stores the high-level primitives produced by the normalizer program.

The present invention provides a preferred method of converting a low-level primitive, in a computer graphics file, to a high-level primitive. A parent computer graphics file is input into the memory system. Low-level primitives are identified in the parent computer graphics file. High-level graphics are formed from the low-level primitives according to various rules.

Further areas of applicability of the present invention will become apparent from the detailed description provided hereinafter. It should be understood that the detailed description and various embodiments, while indicating various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF VARIOUS EMBODIMENTS

The following description of various embodiments is merely exemplary in nature and is in no way intended to limit the invention, its application, or uses.

Figure 2:
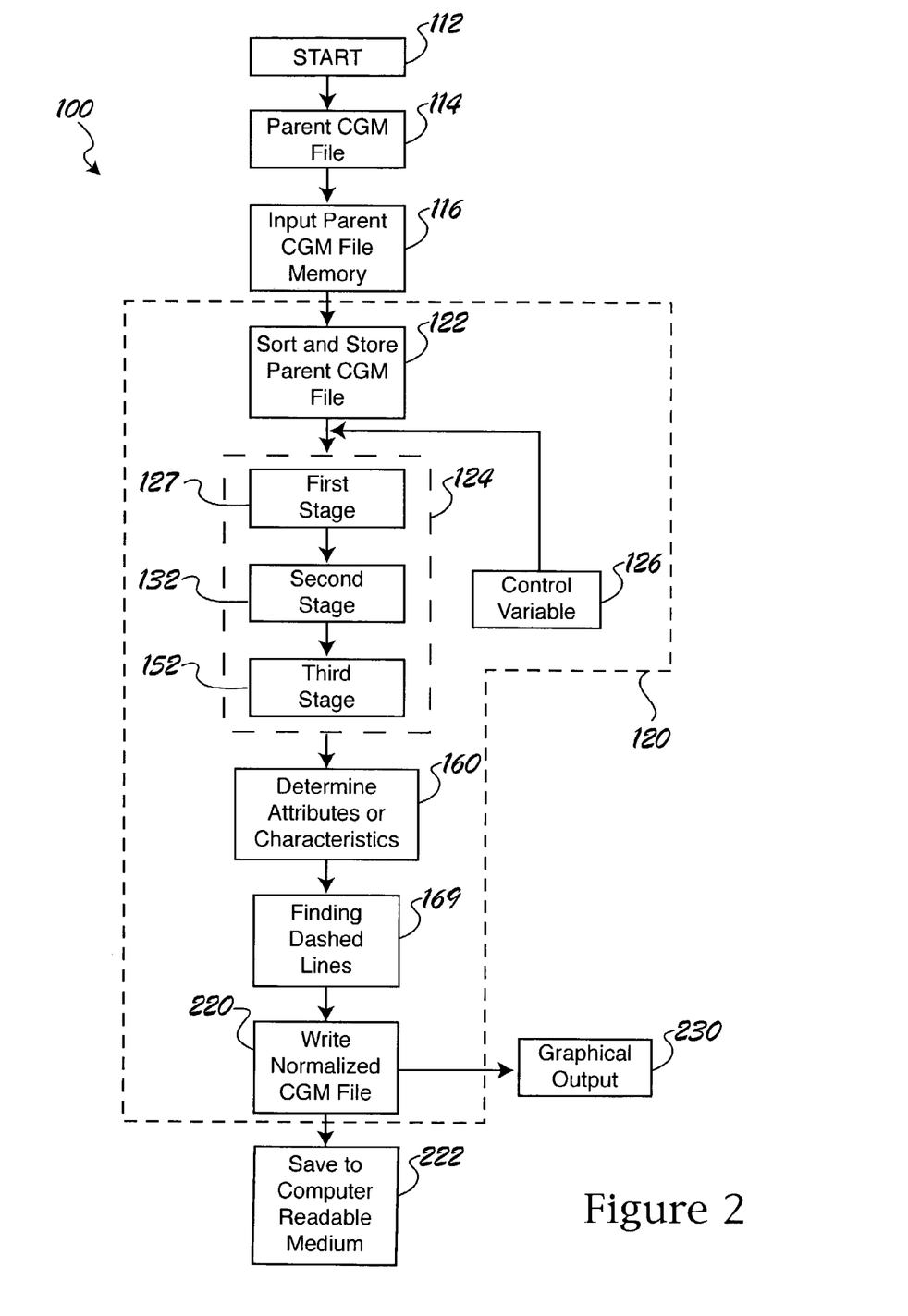
FIG. 2 is a flow chart of a system to convert low-level primitives in a CGM file to high-level primitives.

With reference to FIG. 2, a system 100 in accordance with a preferred embodiment of the present invention for normalizing a computer graphic metafile (CGM) files is illustrated. The method 100 generally includes a start block 112 where the process begins. Then, a first or parent CGM file is provided, as indicated at block 114. The parent CGM may be input at step 116 into a computer memory. The computer memory may include any number of memory types such as a computer hard disk or random access memory (RAM) of a computer. The parent CGM file 114 may be input either directly into the computer memory or it may be copied from a computer readable disk into the computer memory.

After the parent CGM file 114 is input into the computer memory, a normalizer program 120 sorts and stores definitions of the vector graphic objects or primitives contained within the parent CGM file 114, as indicated by block 122. As the normalizer program 120 sorts and stores 122, it stores each different type of artwork, such as lines, arcs, and circles, in separate lists. Therefore, the normalizer program 120 produces a plurality of lists that distinguish among the different types of artwork, which may be stored in the parent CGM file 114. Preferably, this is done by sorting the location of each low-level primitive elements, such as the line, arc or circle, depending upon its x,y coordinate location on the output surface. The locations generally distinguish the items from left to right according to the x-coordinate and from bottom to top according to the y-coordinate. Therefore, the CGM file that is sorted and stored at step 122 includes a list where the artwork located at the lower left corner of the drawing is listed before artwork that appears in the upper right hand corner.

Figure 3:
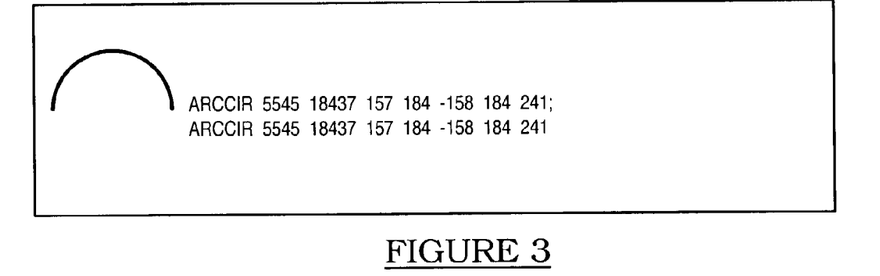
FIG. 3 is a diagrammatic view of a duplicative vector drawing in a CGM file.

As a step or sub-step, in the sorting and storing step 122, duplicate low-level primitive elements are eliminated. For example, and with reference to FIG. 3, an arc may be stored in the parent CGM file 114 as overlaying another arc. Each arc includes the exact same vector coordinates, which have simply been repeated in the parent CGM file 114. This duplication cannot be viewed by a user on a computer display device because the two arcs overlay one another. Therefore, the normalizer program 120, when it is sorting and storing the parent CGM file 114, is able to recognize these duplicative elements and remove them. It will be understood that a duplicative, low-level primitive element has the exact same vector coordinates as another low-level primitive element. Therefore, only those vector elements, which are exact duplicates of one another, will be removed in the sort and storing step 122. The resulting single arc may be viewed as a higher-level or first higher-level primitive, that is two vectors have been merged or replaced with a single vector. The new single vector is a higher-level than the previous two. Though this first higher-level primitive may be combined again to form other higher-level primitives.

With further reference to FIG. 2, after the sorting and storing step 122, a sub-portion 124 of the normalizer program 120 includes a number of steps to produce further higher-level graphical primitives. Producing higher-level graphic primitives first involves inputting control variables in block 126. The control variables define how the various stages of producing higher-level graphic primitives are carried out. The control variables may include any number of various variables, which are used to produce the higher-level graphic primitives. Some examples of the various variables are listed in Table 1 below. It will be understood, however, that any number of control variables may be used.

TABLE 1

Control Variables

| Control Variable Name | Definition of Control Variable |
| --- | --- |
| Very Strict Equal Tolerance | Defines how many units or coordinate coordinate units can separate two pieces of connected art during the first stage |
| Strict Equal Tolerance | Defines how many units or coordinate units can separate two pieces of connected art during the second stage |
| Overlap Tolerance | Defines how many units or coordinate units can separate two overlapping horizontal or vertical lines |
| Max Dashed Line Segment Length | Defines the maximum length for a line to be considered part of a dashed line |
| Max Dashed Line Gap | Defines the maximum gap between segments of a dashed line |
| Min Dashed Line Segment Count | Defines the minimum number of segments that must be found before a dashed line is created |
| Min Shading Lines | Defines the minimum number of lines that must be found in the interior of a polygon before the polygon is defined as filled |

TABLE 1-continued

Control Variables

| Control Variable Name | Definition of Control Variable |
| --- | --- |
| Angle Tolerance | Defines in degrees how far from a target angle a comparison angle can be to meet criteria (e.g. how far from 360 degrees an arc can be before it is treated as a circle) |
| Shading Tolerance | Defines how many units away from the perimeter of a polygon an interior shading line can be |
| Replace Curved Bottoms | Determines if rectangles that have a side that is a curve (not a horizontal or vertical line) are to be found by the Normalizer program 120 |
| Rectangle Corner Tolerance | Defines how many units can separate two sides of a rectangle that meet at a corner |
| Max Allowed Radius | Defines the largest arc or circle that the Normalizer program 120 will create |
| Min Triangle Side Size | Defines the smallest triangle that the Normalizer program 120 will create |

Each of these variables determines how a particular step of producing higher-level graphic primitives proceeds. Each variable is discussed further herein. It will also be understood that any number of these variables or other variables specifically defined herein may be used depending upon the parent CGM file 114. The program that produced the parent CGM file 114 may play a role in determining the value of the control variables. In particular, each program that produces the parent CGM file 114 may use different units. Therefore, as the various stages of producing higher level graphic primitives proceeds, different variable references must be used to accurately produce the higher-level graphic primitives.

Figure 4:
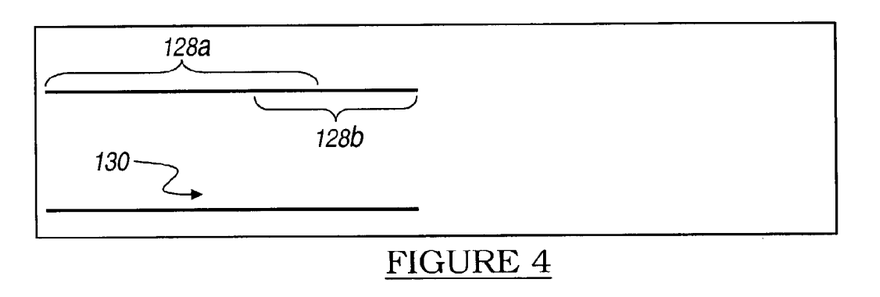
FIG. 4 is a diagrammatic view of overlapping low-level primitives and a normalized high-level primitive.

Producing higher-level primitives in step 124 preferably includes at least three stages. The first stage, as indicated at step 127, determines whether overlapping or interconnecting lines or line segments produce larger line segments or geometrical geometries. For example, with reference to FIG. 4, two overlapping line segments 128a and 128b can be merged into a single longer line segment 130. Here the specific control variable included in the group of control variables, defining overlap tolerance, determines how far apart the two overlapping line segments 128a and 128b may be. This enables a determination to be made that they are, in fact, overlapping line segments, which can be merged into a single, longer line segment 130. If the tolerance is met, the two low-level primitives 128a and 128b are deleted and replaced with the single higher-level primitive line segment 130. Similarly, interconnecting lines may produce triangles or rectangles that are replaced with a vector definition of the individual triangle or rectangle, rather than including the vector definitions of a plurality of line segments producing those geometric geometries.

The second stage, as indicated at step 132, searches for geometries by iterating over remaining lower level primitives, that is primitives such as lines or arcs that were not removed in the first stage of step 127. In the second stage at step 132, lines or arcs that have not already been determined to be higher level primitives are iterated over to determine whether they should be connected to form higher-level primitives. The process, for example, first searches for a lower level primitive that has not been replaced with a higher level primitive and the normalizer program 120 uses the lower level primitive found as a starting point. The normalizer program 120 then searches for other lower level primitives that are very close to the end point of the first lower level primitive.

In the second stage block 132, the very strict equal tolerance variable, from the control variables 126, may be used to define how far two or more lower level primitives may be from each other before they are determined to be a single higher level primitive. The very strict equal tolerance may be any appropriate tolerance, but is generally equal to "up to zero". The tolerance "up to zero" means that there is substantially no distance between the end point of the first lower level primitive and the start point of the second lower level primitive or another higher level primitive.

Figure 5:
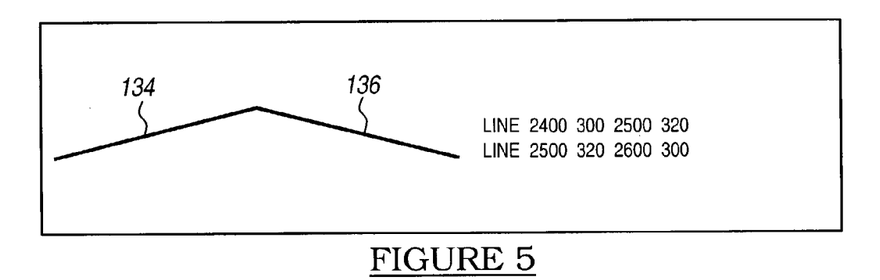
FIG. 5 is a diagrammatic view of two touching low-level primitives.

For example, with reference to FIG. 5, a first line segment 134 has an end point that is equal to the start point of a second line segment 136. That is, the first and second line segments 134, 136 share a point. Therefore, because the first line segment 134 and the second line segment 136 share a point, the normalizer program 120 determines that they should be replaced with a higher level primitive. Thus, the two lower-level primitives are deleted and replaced. This may occur even if the two segments 134 and 136 were already higher level primitives, meaning in the parent CGM file they were defined by more than one segment. Therefore, it will be understood, forming a higher or high-level primitive is not a single step or process. Simply, the normalizer program 120 iterates over all lower level primitives that have not already been replaced with a higher level primitive, until no lower level primitive is found close enough to another lower level primitive to be merged.

After the normalizer program 120 has compiled the iterated list of lower level primitives in the second stage 132, it then determines whether a higher level primitive should replace the list or any portion thereof. In particular, the normalizer program 120 determines whether the list produced in the second stage at step 132 defines a higher level primitive or any number of higher level primitives. It is understood that the second stage will be repeated until no lower level primitives are found that share points with other remaining lower level primitives, or that none of the iterated list of lower-level primitives form higher level primitives.

The second stage at step 132, by reviewing the list and determining whether it defines a higher level primitive, can determine geometries such as arcs, polygons and circles. For example, with reference to FIG. 6, an arc can be produced by interpreting the interactions of a plurality of lower level primitives such as line segments. The second stage determines that a first line segment 138 shares a point with a second line segment 140, which shares a point with a third line segment 142, which shares a point with a fourth line segment 144, which shares a point with a fifth line segment 146, which shares a point with a sixth line segment 148, and which also shares a point with a seventh line segment 150. In this example, the normalizer program 120 has determined that no starting point of another line meets the end point of the seventh line segment 150. Therefore, the second stage 132 can determine whether the first through seventh line segments 138-150 produce a higher-level primitive.

Figure 6:
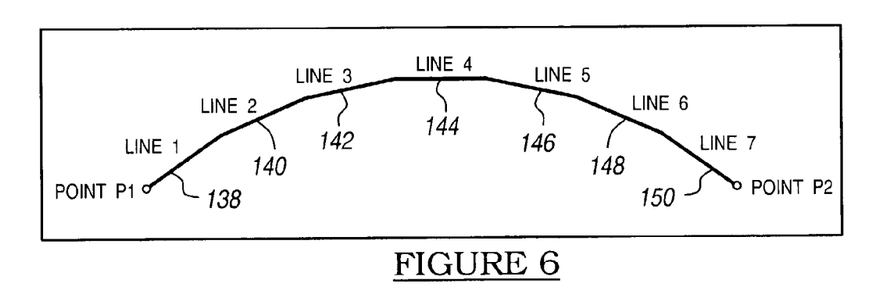
FIG. 6 is a diagrammatic view of touching low-level primitives defining a vector arc.

First the normalizer program 120 may determine whether the first through seventh line segments 138-150 should be an arc having a starting point P1 and an ending point P2. The normalizer program 120 verifies this by determining whether the first line segment 138 through the seventh line segment 150 define an arc. First, perpendicular bi-sectors of the first line segment 138 and the second line segment 140 are used to calculate a radius and center of an arc that is produced by the first and second line segments 138, 140. This process is repeated for each adjoining pair of line segments. After this, an average radius and an average center for each pair of line segments 138-150 are calculated. After the average radius and centers are determined, the normalizer program 120 then decides whether each of the six calculated radii are close enough to the average radius and whether each of the six centers are close enough to the average center to replace the first through seventh line segments 138-150 with an arc. If the radius of each line and the center of each line are close enough to the average radius and center, then an arc is defined as a vector having a starting point P1 and an ending point P2. The tolerances defining how close the radius and center must be to the averages are also variables, which may be defined in the control variables input at step 126.

The second stage at step 132 replaces the information defining each of the seven line segments 138-150 with a vector defining a single arc P1-P2. Therefore, this reduces the information stored because the single arc P1-P2, the higher level primitive defining the arc that is defined by the seven lines segments 138-150 in the parent CGM, is the only primitive stored, thereby, simplifying further processing. It will be understood that this or similar processes can be used to determine whether an arc is formed of arc segments or whether other forms such as rectangles, squares or triangles are formed by numerous line segments. Generally, as long as the lower level primitives define a geometry that the normalizer program 120 recognizes, the normalizer program 120 may replace the individual segments with a vector defining the recognized geometry.

Returning reference to FIG. 2, a third stage at step 152 creates further higher level primitives from the sort and stored list created at step 122. The second stage 132 searches for segments that were connected by at least one point. In the third stage at step 152, a certain degree of tolerance is allowed. That is, segments are searched which do not actually share a point. The degree of tolerance allowed by the normalizer program 120 may be controlled by one of the variables included in the control variables used at step 126.

Figure 7:
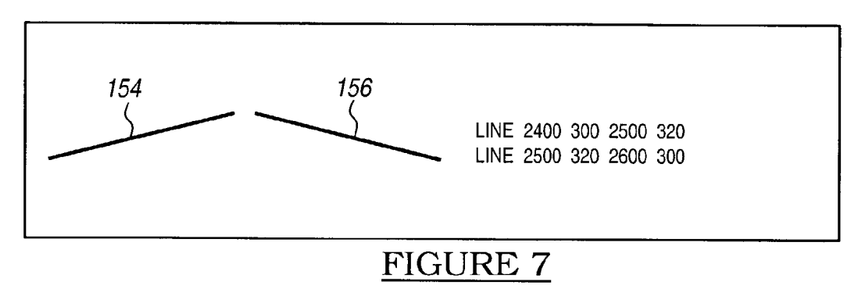
FIG. 7 is a diagrammatic view of two non-touching low-level primitives.

For example, with the reference to FIG. 7, a first line segment 154 and a second line segment 156 which do not overlap or share a point may be determined to be close enough by the normalizer program 120 in the third stage block 152 to be formed into a single line segment. For example, the control variables file input at block 126 may include a tolerance of five units. Therefore, if an end point of the first line segment 154 is separated from a start point of the second line segment 156 by no more than five units, then the normalizer program 120 determines that the first line segment 154 and the second line segment 156 should actually be treated as a single line segment for the purpose of finding and defining higher-level primitives.

After the normalizer program 120 has finished producing the higher-level primitives via the steps making up subportion 124 of the method 100 the normalizer program 120 can then determine whether any of these higher-level primitives should have other attributes or characteristics. The normalizer program 120 next determines specific attributes or characteristics, as indicated by block 160. Different attributes or characteristics can include attributes such as edge visibility, that is whether an edge is visible or hidden, edge width, such as how thick an edge should appear in the computer output, and a fill style, which is whether the higher level primitives should appear solid or hollow.

Figure 8A:
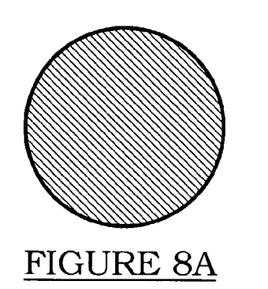
FIGS. 8a and 8b are two diagrammatic views of low-level filled circles.
Figure 8B:
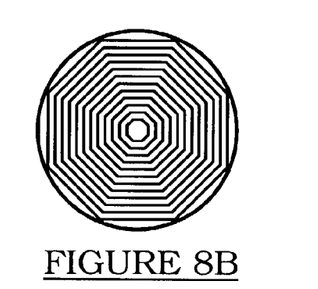

One such attribute, illustrated particularly in FIGS. 8a and 8b, is the filling of a circle. Each circle illustrated in FIGS. 8a and 8b appears filled or solid on a computer display when output by the computer. Nevertheless, the circle illustrated in FIG. 8a includes a plurality of line segments having a starting point on a first point on the circumference of the circle and an end point on a second point of the circumference of the circle. The lines are close enough together that when output by the computer, the output appears on a display as a solid circle. The circle in FIG. 8b includes a plurality of inner polygons, which also fill the circle in FIG. 8b when output by the computer.

Each of these fill techniques illustrated in FIGS. 8a and 8b require that the parent CGM file 114 include not only the vector definition of the circle, but vector definitions of each of the line segments or polygons used to fill the circle. Therefore, the normalizer program 120, using the variables present in the control variables of step 126, determines whether the circle should be filled or not. In particular, the control variables may define how close together segments should be inside the circle or how close to an edge of the circle the segments must be to be considered fill for the circle, rather than distinct segments to be drawn within the circle. The control variables may also define the percentage of the area within the circle to be covered to define the filled circle. If it is determined that the circle should appear filled when output to a display, the normalizer program 120 simply defines a vector circle which is filled. This greatly reduces the amount of information associated with each particular higher level primitive, which includes additional attributes, such as being filled or having particular edge thicknesses.

After producing higher-level primitives and determining attributes and characteristics at step 160 of the higher level primitives, other lower level primitives may still be left in the sorted and stored list created at block 122. In particular, dashed lines may still be present which are defined as individual segments in the parent CGM. Therefore, the step of finding dashed lines is next undertaken as indicated at block 169. In finding dashed lines, the normalizer program 120 reviews the sort and stored list from block 122 to determine whether any lower level primitives define dashed lines. The parent CGM file 114 may define a dashed line as a plurality of separate line segments which form the appearance of a dashed line when output. The normalizer program 120 finds dashed lines by reviewing the remaining low-level primitives for relatively short lines which are spaced apart by relatively short "connecting" spaces. For each of these, the length of the line segment, space separating them, and numbers of segments in a dashed line, can be stored in the control variables file associated with block 126.

Figure 9A:
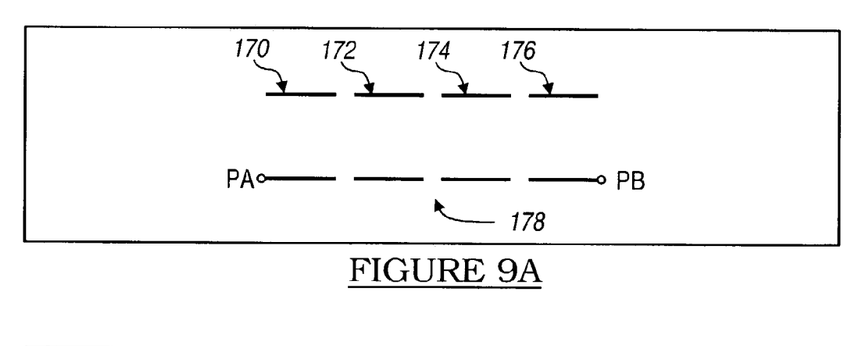
FIGS. 9a and 9b are two diagrammatic views of low-level primitive dashed lines.

With reference to FIG. 9a, the normalizer program 120 reviews the remaining lower level primitives, such as line segments, that have not been placed in higher-level primitives, for line segments that are relatively short and in a particular orientation, such as vertical and horizontal. The normalizer program 120 other line segments that are of the same relative length and same orientation and near the first line segment. Therefore, the normalizer program 120 may identify a first line segment 170, determine that it is in a horizontal position, and find a second line segment 172 that is also horizontal and that has a length substantially equal to the first line segment 170 and spaced a short distance from the first line segment 170. The normalizer program 120 then searches for a third line segment 174 and a fourth line segment 176, which may all be in the same orientation and have a substantially identical length and distance separating them. The normalizer program 120 determines that the first through fourth line segments 170-176 are within the parameters in the control variables file at block 126 and determines that they should actually be a dashed line segment 178 which has a beginning point PA and an ending point PB. Therefore, the normalizer program 120 replaces the four individual line segments 170-176 with a single line segment 178, that is dashed, and defines a higher-level primitive.

Figure 9B:
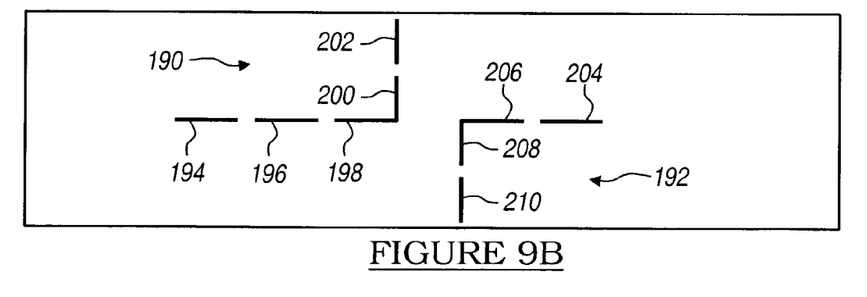

With reference to FIG. 9b, the normalizer program 120 can also use other criteria to determine whether a line should be dashed or not. Particularly, several individual line segments may be separated into two portions: a first portion 190 and a second portion 192. The first portion 190 includes a first horizontal line portion 194, a second horizontal line portion 196 and a third horizontal line portion 198 while also including a first vertical line section 200 and a second line segment 202. The second portion 192 includes a first horizontal line segment 204 and a second horizontal line segment 206, while also including a first vertical line segment 208 and a second vertical line segment 210. The normalizer program 120 may not produce a dashed line segment that includes the first, second, and third horizontal line segments 194-198 of the first portion 190 and the first and second horizontal line segments 204, 206 of the second portion 192. Rather, the normalizer program 120 determines that the spacing between the third horizontal line segment 198 of the first portion 190 and a first vertical line segment 200 of the first portion 190 are closer than the second horizontal line segment 206 of the second portion 192. Therefore, the normalizer program 120 determines that the first, second, and third horizontal line segments 194, 196, 198 of the first portion 190 should be a dashed line while the first and second horizontal lines segments 204, 206 of the second portion 192 should be a separate dashed line segment.

It will be understood that the normalizer program 120 can also be given other rules to determine how to distinguish between dashed lines that are separated by other objects rather than determining that a dashed line should intersect that object. Finding dashed lines, as indicated at step 169, is preferably done after producing higher-level primitives (step 124) to reduce error. That is, if finding dashed lines at step 169 was determined before producing various higher level primitives 124, then line segments that may actually be part of the higher level primitives would be placed into dashed lines, which would remove them from the determination of higher level primitives. Therefore, it is preferred to find dashed lines after producing higher-level primitives 124.

After the normalizer program 120 has sorted and stored the parent CGM file 114 at step 122, input the control variables at step 126, produced higher-level primitives in sub-portion 124 of the method 100, determined attributes and characteristics at step 160, and found dashed lines at step 169, the normalizer program 120 can generate the normalized or child CGM file, as indicated at step 220. In writing the normalized CGM file the normalizer program 120 stores a list of each type of primitive found. Each list includes the higher-level primitive, built or formed from the lower level primitives, and various low-level primitives that can be reclassified as high-level primitives because they are elements that are not duplicated or replaced with higher-level primitives. That is, the normalized CGM file 222 includes all of the unduplicated and higher-level primitives determined in the previous steps 122, 124, 160 and 169.

The normalized CGM file also includes any lower level primitives that were not determined to be a part of any higher level primitive or attributes thereof. Essentially, a low-level primitive is determined to be a high-level primitive when it is substantially associated only with itself. Alternatively, a low-level primitive determined to be a high-level primitive is determined to be not within any of the control variables of block 126.

The normalizer program 120 then iterates each list and writes vectors to code each higher-level primitive, that has been determined. The resulting child or normalized CGM file has the additional benefit that the vectors are sorted by their x, y location on the output surface allowing the next program that uses the CGM file to optimize its processing by taking advantage of the sorted order of the vectors. Generally, this decreases read and processing times of the normalized CGM file, written in step 220, as compared to the parent CGM file 114.

Generally, the normalized CGM file is between about ten percent and about ninety percent smaller than the parent CGM file 114. It will be understood that the reduction in size of the normalized CGM file over the parent CGM file 114 depends upon the specifics of the parent CGM file 114. If the parent CGM file 114 was created with a program that is less efficient at producing higher-level primitives than other programs, it will be reduced more than a more efficient parent CGM file. Also, a parent CGM file 114 that includes many higher-level primitives such as circles and polygons that do not need to be improved, is reduced less.

The normalized CGM file may then be graphically output at step 230 or saved to a computer readable medium at step 232, or retained in the computer memory. Therefore, the graphical output at step 230 includes all of the higher-level primitives, attributes, and dashed lines along with the lower level primitives not placed into any of these categories, but without any of the duplicates of the parent CGM file 114. The graphical output of the normalized CGM file at step 222 is substantially identical to the graphical output of the parent CGM file 114. In other words, they look virtually the same to a viewer. Only the duplications and inefficiencies of the parent CGM file 114 have been removed due to the normalizer program 120. Furthermore, the normalized CGM file can be much more easily used and interpreted by other programs, which can read CGM files. Simply, the written normalized CGM file includes less data for the computer to process in order to graphically output the normalized CGM file.

It will be understood that any number of processing steps may be used to produce a normalized CGM file. For example, additional stages may be used when producing higher-level graphic primitives. In particular, a maximum tolerance may be known for the parent CGM file input 114 and a plurality of iterations used to reach this maximum tolerance. Therefore, rather than simply having a zero tolerance second stage in block 132 and a maximum tolerance third stage in block 152, a plurality of intermediate tolerances may be interspersed in between the second stage and the third stage. It is preferred to only have the second stage and third stage to increase computational efficiency while producing files that have substantially no errors. For example, the written normalized CGM file, using only a second stage and third stage, may not include errors in excess of about 0.01% Therefore, the probability of an error is well within tolerances when producing the graphical output at step 230.

The normalizer program 120 can be used to create more efficient normalized CGM files from any parent CGM file 114 input. The normalizer program 120 can be run with any generally known processor or micro-processor such as used by any known computer, but is preferably run on a computer which includes at least 128 MB of RAM and a Pentium® III processor having an internal clock speed of at least about 500 MHz. With these computer specifications, the parent CGM 114 file can generally be converted to a normalized CGM file in about one second. It will be understood that higher computer specifications may produce the normalized CGM file in less time than a lower specification computer, but the lower specification computer will still produce an acceptable normalized CGM file.

CGM files may be used in any number of applications. For instance, CGM files may graphically represent the portions of a wiring diagram or circuit board. Therefore, the different vector portions of the CGM file define different portions of the wiring diagram or circuit board. It will be understood that the CGM files may be used for any number of applications.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A computer system for normalizing computer graphic files comprising:
    a parent computer vector graphics file defining a low-level primitive vector;
    a normalizer computer program including a rule to determine a higher-level primitive vector from said low-level primitive vector contained in said parent computer vector graphics file;
    a processor to automatically process said parent computer vector graphics file by executing said normalizer computer program; and
    a memory system in communication with said processor to store said parent computer vector graphics and said higher-level primitive vector determined by said normalizer computer program;
    where said rule includes a plurality of parameters including all of: a first strict equal tolerance, a second strict equal tolerance, an overlap tolerance, a maximum-segment length, a maximum-gap, a minimum-segment count, a minimum-shading lines, an angular tolerance, a shading tolerance, a replace curved bottoms, a rectangular corner tolerance, a maximum allowed radius, a minimum triangle side size, or combinations thereof.

2. The computer system of claim 1, wherein said low-level primitive vector includes a vector graphic object that is displayable on a human readable display.

3. The computer system of claim 2, wherein said vector graphic object includes a first plurality of vector coordinates defining a second vector graphic object, wherein said single second vector graphic object substantially defines all of the geometry defined by said first plurality of vector coordinates.

4. The computer system of claim 3, wherein said higher-level primitive vector includes said second vector graphic object.

5. The computer system of claim 1, wherein:
    said low-level primitive vector includes a plurality of said low-level primitive vectors;
    said parent computer program includes a first algorithm for sorting said parent computer graphics file to locate said plurality of low-level primitive vectors; and
    said parent computer program further includes a second algorithm for creating a graphics list listing each of the low-level primitive vectors determined from said parent computer graphics file.

6. The computer system of claim 5, wherein:
    said low-level primitive vector includes a plurality of said low-level primitive vectors;
    said normalizer computer program further includes an algorithm according to the rule to determine the overlap tolerance of any of said plurality of low-level primitive vectors; and
    said normalizer computer program determines a higher-level primitive vector to define and replace said overlapped low-level primitive vectors.

7. The computer system of claim 1, wherein:
    said low-level primitive vector includes a plurality of said low-level primitive vectors;
    said normalizer computer program includes an algorithm according to the rule to determine a distance based upon either of the first strict equal tolerance or the second strict equal tolerance between a first selected plurality of said plurality of low-level primitive vectors and a second selected plurality of said plurality of low-level primitive vectors;
    said normalizer computer program determines a high-level primitive vector to define said plurality of low-level primitive vectors if said distance is within a selected range.

8. A computer system of claim 7, wherein said selected range includes a common end point between said first selected plurality of plurality low-level primitive vectors and said second selected plurality of said plurality of low-level primitive vectors.

9. The computer system of claim 7, wherein said selected range defines an end point of a first low-level primitive vector that is at least one unit apart from an end point of a second of said plurality of low-level primitive vectors.

10. The computer system of claim 1, wherein said low-level primitive vector includes a plurality of said low-level primitive vectors;
    wherein said normalizer program determines the presence of a space filling pattern by determining a relative location of said plurality of low-level primitive vectors including:
    at least one of said plurality of low-level primitive vectors defining an enclosed area;
    a selected plurality of said plurality of low-level primitive vectors substantially filling said defined enclosed area; and
    a high-level primitive vector includes a vector graphic object defining the enclosed area and saved as a single higher-level primitive vector with a filled attribute.

11. The computer system of claim 1, wherein:
    said low-level primitive includes a plurality of said low-level primitive vectors;
    said high-level primitive includes a plurality of said high-level primitive vectors; and
    said normalizer computer program determines said plurality of high-level primitive vectors from said plurality of low-level primitive vectors wherein said plurality of high-level primitive vectors is smaller in number than said low-level primitive vectors.

12. The computer system of claim 1, further comprising:
    a child computer graphics file including said higher-level primitive vector that is determined by said normalizer computer program from said low-level primitive vector.

13. The computer system of claim 12, wherein said child computer graphics file includes only said higher-level primitive vector.

14. The computer system of claim 12, wherein said child computer graphics file includes a plurality of higher-level primitive vectors;
    wherein said plurality of higher-level primitive vectors includes:
    a combination of a selected plurality of said low-level primitive vectors; and
    a selected plurality of low-level primitive vectors determined to be high-level primitive vectors.

15. The computer system of claim 1,
wherein said low-level primitive vector of said parent computer vector graphics file is defined by a low-level primitive vector rule;
wherein said higher-level primitive vector is defined by at least one of the plurality of parameters;
wherein said normalizer computer program redefines said low-level primitive to said higher-level primitive with said rule.

16. The computer system of claim 1, wherein only said processor determines said higher-level primitive vector by executing said normalizer computer program.

17. A method for converting a low-level primitive vector in a computer graphics file to a higher-level primitive vector, the method comprising:
providing a computer including an accessible memory system and a processor in communication with said accessible memory system;
inputting a parent computer graphics file into said memory system including the low-level primitive vector;
identifying the low-level primitive vector in said parent computer graphics file with a processor; and
creating at least one higher-level primitive vector from the low-level primitive vector based at least upon a rule with the processor;
wherein said rule includes a plurality of parameters including all of: a first strict equal tolerance, a second strict equal tolerance, an overlap tolerance, a maximum-segment length, a maximum-gap, a minimum-segment count, a minimum-shading lines, an angular tolerance, a shading tolerance, a replace curved bottoms, a rectangular corner tolerance, a maximum allowed radius, a minimum triangle side size, or combinations thereof;
wherein defining said high-level primitive vector includes identifying at least two low-level vectors that meet at least one of the rule parameters to be defined as the high-level primitive vector.

18. The method of claim 17, further comprising storing said higher-level primitive vector in a storage system.

19. The method of claim 17, further comprising:
forming said parent computer graphics file including:
defining a first low-level primitive vector by creating a first vector graphic object; and
defining a second low-level primitive vector by defining a second vector graphic object.

20. The method of claim 19, wherein said inputting a parent computer graphics file includes storing said plurality of low-level primitive vectors in said accessible memory system.

21. The method of claim 17, wherein said identifying the low-level primitive vector includes:
determining each of a plurality of vectors defining graphics in said parent computer graphics file; and
defining a high-level primitive vector according to a position of each of said plurality of vectors in a coordinate space.

22. The method of claim 21, wherein determining said high-level primitive vector includes:
selecting a plurality of said plurality of vectors which are associated according to a rule; and
defining said high-level primitive vector to define each of said selected plurality of vectors.

23. The method of claim 17, wherein said first strict equal tolerance is more strict than said second strict equal tolerance.

24. The method of claim 17, wherein said rule includes determining a geometry of said plurality of said vectors.

25. The method of claim 17, further comprising:
determining if the low-level primitive vector is a higher-level primitive vector;
wherein storing said higher-level primitive vector includes storing only a vector defining said higher-level primitive vector.

26. The method of claim 25, wherein said determining if the low-level primitive vector is a higher-level primitive vector includes determining if said low-level primitive vector is associated with any other of said low-level primitive vectors or higher level primitive vectors.

27. A method for converting a low-level primitive vector in a computer graphics file to a higher-level primitive vector, the method comprising:
providing an accessible memory system and a processor in communication with said accessible memory system;
inputting a parent computer graphics file into said memory system including the low-level primitive vector;
identifying the low-level primitive vector in said parent computer graphics file;
creating at least one higher-level primitive vector from the low-level primitive vector with the processor based upon a rule; and
storing a child computer graphics file including the at least one higher-level primitive vector.
wherein said rule includes a plurality of parameters including all of: a first strict equal tolerance, a second strict equal tolerance, an overlap tolerance, a maximum-segment length, a maximum-gap, a minimum-segment count, a minimum-shading lines, an angular tolerance, a shading tolerance, a replace curved bottoms, a rectangular corner tolerance, a maximum allowed radius, a minimum triangle side size, or combinations thereof.

28. The method of claim 27, wherein the parent computer graphics file includes a plurality of the low-level primitive vectors encoded in the parent computer graphics file;
wherein only the processor creates the at least one higher-level primitive vector from the low-level primitive vectors including:
analyzing each of the plurality of the low-level primitive vector in the parent computer graphics file;
determining a relationship of at least two of the plurality of the low-level primitive vectors; and
outputting the at least one higher-level primitive vector.

29. A method for converting a low-level primitive vector in a computer graphics file to a higher-level primitive vector, the method comprising:
providing a computer including an accessible memory system and a processor in communication with said accessible memory system;
inputting a parent computer graphics file into said memory system including the low-level primitive vector;
identifying the low-level primitive vector in said parent computer graphics file with a processor; and
creating at least one higher-level primitive vector from the low-level primitive vector with the processor,
wherein said identifying the low-level primitive vector includes:
determining each of a plurality of vectors defining graphics in said parent computer graphics file; and
defining a high-level primitive vector according to a position of each of said plurality of vectors in a coordinate space;
wherein determining said high-level primitive vector includes:
selecting a plurality of said plurality of vectors which are associated according to a rule; and defining said high-level primitive vector to define each of said selected plurality of vectors;

where said rule includes a plurality of parameters including all of: a first strict equal tolerance, a second strict equal tolerance, an overlap tolerance, a maximum-segment length, a maximum-gap, a minimum-segment count, a minimum-shading lines, an angular tolerance, a shading tolerance, a replace curved bottoms, a rectangular corner tolerance, a maximum allowed radius, a minimum triangle side size, or combinations thereof;

wherein defining said high-level primitive vector includes identifying at least two low-level vectors that meet at least one of the rule parameters to be defined as the high-level primitive vector.

* * * * *